(12) United States Patent
Kinzelmann et al.

(10) Patent No.: US 8,455,102 B2
(45) Date of Patent: Jun. 4, 2013

(54) METHOD FOR GLUING FILM-LIKE SUBSTRATES

(75) Inventors: Hans-Georg Kinzelmann, Pulheim (DE); Ekaterina Ryjkina, Duesseldorf (DE); Thomas Kostka, Titz (DE); Christoph Loschen, Erkrath (DE); Philipp Spuhler, Duesseldorf (DE); Michael Hoeltgen, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/441,375

(22) Filed: Apr. 6, 2012

(65) Prior Publication Data

US 2012/0258306 A1  Oct. 11, 2012

Related U.S. Application Data

(63) Continuation of application No. PCT/EP2010/062898, filed on Sep. 2, 2010.

(30) Foreign Application Priority Data

Oct. 8, 2009 (DE) .......................... 10 2009 045 488

(51) Int. Cl.
*B32B 27/40* (2006.01)
*C09J 175/04* (2006.01)

(52) U.S. Cl.
USPC ............... 428/423.1; 428/425.8; 428/340; 156/331.7

(58) Field of Classification Search
USPC ............ 428/425.8, 340, 423.1; 156/331.7
See application file for complete search history.

(56) References Cited

U.S. PATENT DOCUMENTS

| | | | |
|---|---|---|---|
| 4,663,415 A * | 5/1987 | Grogler et al. | 528/61 |
| 5,891,960 A | 4/1999 | Claar et al. | |
| 2004/0084138 A1 * | 5/2004 | Henke et al. | 156/272.2 |

FOREIGN PATENT DOCUMENTS

| | | |
|---|---|---|
| EP | 0340586 | 11/1989 |
| EP | 0384404 | 8/1990 |
| GB | 2222592 | 3/1990 |
| JP | 07118623 | 5/1995 |
| WO | 2007008199 | 1/2007 |

OTHER PUBLICATIONS

International Search Report issued in connection with International Patent Application No. PCT/EP2010/062898 mailed.
EN ISO 2555.
DIN 53278.

* cited by examiner

*Primary Examiner* — Thao T. Tran
(74) *Attorney, Agent, or Firm* — James E. Piotrowski; Steven C. Bauman

(57) ABSTRACT

A method for adhesively bonding film-like substrates, in which a two-component polyurethane adhesive is applied to a film and then a second film is applied, a two-component polyurethane adhesive being used that consists of—a component A containing at least one prepolymer having at least two NCO groups,—a component B containing at least one polymeric or oligomeric crosslinker having at least two groups that react with NCO groups, wherein component B contains 0.05 to 5 wt. % of a low-molecular-weight compound C, which—should have a nucleophilic group that reacts with NCO groups and—contains a hydrogen-bridging group, selected from O=C—O⁻ or O=C—C—O⁻ or O=C—C=C—O⁻ or protonated forms.

15 Claims, No Drawings

METHOD FOR GLUING FILM-LIKE SUBSTRATES

The invention relates to a method for adhesively bonding film-like substrates to form multilayer films, wherein improved two-component polyurethane laminating adhesives are used.

Multilayer films are generally known in the packaging industry. They can be constructed from two or more layers, the individual layers being adhesively bonded to one another as a film. These films can consist of polymers, such as polyethylene, polypropylene, polyamide or polyester, while paper layers and metal films can also be included. Metallized surfaces can moreover also be used. Adhesives for this adhesive bonding are known in broad areas of application. They can be water-based adhesives or hot-melt adhesives, moreover one-component or two-component crosslinking systems are known.

U.S. Pat. No. 5,891,960 describes solvent-containing crosslinkable compositions as coating agents. This composition should consist of a polymer framework having epoxy groups, wherein citric acid is reacted at these groups to form a carboxyl group-containing polymer. This COOH group-containing polymer is then crosslinked with isocyanates to form the coating.

GB 2,222,592 is moreover known. This describes a method for coating a metal surface, steel as an example, with polyhydroxyaryl compounds in aqueous solution and then with a crosslinkable epoxy compound. This epoxy-crosslinking composition can contain aromatic phenols, carboxylic acid ester groups or carbonamide groups. Polyurethane systems containing such polyhydroxyaryls are not described.

WO 2007/008199 describes an aqueous primer composition containing a crosslinking system and a corrosion inhibitor. Various metal ions and complexing agents are described as corrosion inhibitors.

The prior art describes adhesives and coating agents for metal surfaces. These should contain various substances, inter alia also phenol derivatives, and various crosslinkable systems are also described. Laminating adhesives for the large-area adhesive bonding of flexible and elastic materials are not described. The problems that arise in the adhesive bonding of plastic substrates to flexible metal substrates are likewise not described. In a composite comprising metal surfaces and plastic films, the problem frequently exists that adequate adhesion to the metal surface is not generated. In order to achieve an adequate flexibility, the adhesive should develop its properties in a thin layer. A further problem is also a reduction in adhesion that occurs under the influence of heat or moisture. This adhesion should moreover be generated quickly, so that such composite materials can undergo further processing as rapidly as possible. The adhesive must have applicational properties that allow application in a thin layer and produce a uniform, faultless adhesive layer.

The prior art gives rise to the object that a method for adhesively bonding films should be provided that produces an adhesive layer having good adhesion between plastic and metal surface, that allows a rapid build-up of adhesion between the two substrates and that results in a lasting bond to form a multilayer film. A low application viscosity should furthermore be obtained. In addition, an improved adhesive bonding stability of the composite should be obtained.

The object is achieved by a method for adhesively bonding film-like substrates, in which a two-component polyurethane adhesive is applied to a film and then a second film is applied under pressure, a two-component polyurethane adhesive being used that consists of a component A containing at least one prepolymer having at least two NCO groups, a component B containing at least one polymeric or oligomeric crosslinker having at least two groups that react with NCO groups, wherein component B contains 0.05 to 5 wt. % of a low-molecular-weight compound C, which should have a nucleophilic group that reacts with NCO groups and contains a hydrogen-bridging group, selected from $O{=}C{-}O^-$ or $O{=}C{-}C{-}O^-$ or $O{=}C{-}C{=}C{-}O^-$ or protonated forms.

The invention furthermore relates to a multilayer film having at least one metal layer inside the film, which has been adhesively bonded using a corresponding two-component polyurethane adhesive by the method according to the invention.

Methods for laminating films are known. Various adhesives can be used for this. According to the present invention specially modified two-component polyurethane laminating adhesives are used, which are good to work with and result in an improved adhesion of the adhesively bonded substrates. The known flexible film-like substrates, such as plastic films, metal films, paper films or card, can be used as substrates in the method according to the invention. These are adhesively bonded in two or more layers to form multilayer films.

The known flexible films can be used as film materials for producing such multilayer films by the method according to the invention. They are substrates consisting of thermoplastics in film form, for example polyolefins, such as polyethylene (PE) or polypropylene (PP, CPP, OPP), polyvinyl chloride (PVC), polystyrene (PS), polyesters, such as PET, polyamide, natural polymers, such as cellophane or paper. The film materials can also be modified, for example by modifying the polymers with functional groups, or additional components, for example pigments, dyes or foamed layers, can be contained in the film. They can be colored, printed, colorless or transparent films.

Multilayer films can be produced from the corresponding flexible film materials together with the suitable two-component polyurethane adhesives. In particular, the adhesive is suitable for adhesively bonding film materials having a metal surface, in particular an aluminum surface. This surface can also be partly or completely oxidized. For that reason, according to a preferred embodiment, the two-component polyurethane adhesive is applied to a metal film, in particular an aluminum film, or to a plastic film having an aluminum-coated surface.

The adhesive can be applied to the films using known devices. These are known to the person skilled in the art and can comprise spray application, knife application, print application and roller application.

An adhesive that is suitable according to the invention is a two-component adhesive containing as one component prepolymers containing NCO groups and as the second component at least one crosslinker having at least two functional groups that react with NCO groups, together with further additives. The crosslinker component additionally contains that low-molecular-weight compound C that is necessary according to the invention.

A polyurethane prepolymer bearing at least two isocyanate groups or a mixture of such PU prepolymers, which can be obtained for example by reacting a polyol component with at least one difunctional isocyanate in stoichiometric excess, is used as component A.

PU prepolymers within the meaning of the present invention are reaction products of compounds bearing OH groups or NH groups with an excess of polyisocyanates. The polymers and polyisocyanates that can be used in the synthesis of the PU prepolymers are known to the person skilled in the art. They are the polyols known for adhesive applications or corresponding compounds having secondary and/or primary amino groups. Starting compounds containing OH groups are preferred. Polyols having a molecular weight of up to 20,000 g/mol, in particular from 100 to 10,000 g/mol (number-average molecular weight, $M_N$, as can be determined by GPC), are suitable in particular for synthesizing said prepolymers. They can for example be polyols based on polyethers, polyesters, polyolefins, polyacrylates, alkylene polyols, or as another embodiment analogous compounds having NH groups.

One embodiment preferably uses low-molecular-weight unbranched polyols having a molecular weight of below 1500 g/mol, wherein said polyols should have three or preferably two OH groups. Individual polyols can be selected, but mixtures of polyols can also be used. Diols in particular are preferably selected, in particular those having terminal OH groups. Another embodiment uses OH-containing polymers having a molecular weight from 1500 to 20,000 g/mol. A large number of OH groups can be included here or alternatively just two OH groups.

The polyol component can have a low molecular weight, for example from approximately 60 g/mol to 1500 g/mol, but higher-molecular-weight polymers can also be reacted, for example those having a molecular weight from 1500 to 20,000 g/mol. An average of two reactive groups should be present at the polyol, for example diols, but it is also possible to react compounds having a plurality of functional groups.

The polyisocyanates known per se having two or more isocyanate groups can be used as polyisocyanates in the prepolymer synthesis. Suitable polyisocyanates are selected from the group comprising 1,5-naphthylene diisocyanate, 2,4- or 4,4'-diphenylmethane diisocyanate (MDI), hydrogenated MDI (H12MDI), xylylene diisocyanate (XDI), tetramethyl xylylene diisocyanate (TMXDI), 4,4'-diphenyldimethyl methane diisocyanate, di- and tetraalkylene diphenylmethane diisocyanate, 4,4'-dibenzyl diisocyanate, 1,3-phenylene diisocyanate, 1,4-phenylene diisocyanate, the isomers of toluylene diisocyanate (TDI), 1-methyl-2,4-diisocyanatocyclohexane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane (IPDI), phosphorus- or halogen-containing diisocyanates, tetramethoxybutane-1,4-diisocyanate, naphthalene-1,5-diisocyanate (NDI), butane-1,4-diisocyanate, hexane-1,6-diisocyanate (HDI), dicyclohexyl methane diisocyanate, cyclohexane-1,4-diisocyanate, ethylene diisocyanate, methylene triphenyl triisocyanate (MIT), phthalic acid bis-isocyanatoethyl ester, trimethyl hexamethylene diisocyanate, 1,4-diisocyanatobutane, 1,12-diisocyanatododecane, dimer fatty acid diisocyanate and lysine ester diisocyanate. At least trifunctional isocyanates can also be used, such as are produced by trimerization or oligomerization of diisocyanates or by reacting diisocyanates with polyfunctional compounds containing hydroxyl or amino groups. Diisocyanates are preferably mostly used.

The reaction control can be influenced by the amount of isocyanates, If a high excess of isocyanates is used, PU prepolymers are formed in which the OH groups have been functionalized in isocyanate groups. Only a slight increase in molecular weight is established here. If lower amounts of isocyanates are used or if the reaction is performed in stages, it is known that the molecular weight of the prepolymers is increased in comparison to the starting compounds. In this case it must be ensured overall that an excess of isocyanate is used relative to the complete reaction.

PU prepolymers are likewise known that have been produced from mixtures of isocyanates. Such prepolymers can contain isocyanate groups of differing reactivity.

The reaction of the polyol compound with the isocyanates can take place in a known manner. It is possible to work in solvents, but the starting compounds can also be reacted with one another without solvent. It is moreover possible to work with an excess of isocyanates, with unreacted monomeric isocyanates being present in the reaction mixture. Another mode of operation ensures through the type of reaction control that only small amounts of monomeric, unreacted isocyanates are present in the mixture. A further mode of operation distills off unreacted diisocyanates, allowing products having a particularly low monomer content to be produced.

The known PU prepolymers having reactive NCO groups can be used for the invention. Such prepolymers are known to the person skilled in the art and can also be obtained commercially. PU prepolymers that have been produced on the basis of polyester polyols or polyether polyols by reaction with diisocyanates are preferred in particular in the context of this invention. The PU prepolymers used in the context of the present invention generally have a molecular weight from 500 to approximately 30,000 g/mol, preferably up to 15,000 g/mol, in particular from 1000 to 5000 g/mol.

In one embodiment the PU prepolymer having reactive NCO groups that is suitable according to the invention can optionally also additionally contain polyisocyanates in component A. These can be aliphatic, aromatic or polymeric isocyanates. Examples are the known adhesive polyisocyanates, such as MDI, TDI, HDI, IPDI, XDI, TMXDI, NDI, pMDI or corresponding carbodiimides, isocyanurates or biurets. These can be added during the prepolymer production reaction, but they can also be added to component A at a later stage. Such polyisocyanates are suitable in particular that have only a low vapor pressure, for example less than 0.01 mbar at 25° C.

In addition to the suitable PU prepolymers, component A can also contain further auxiliary substances and additives. It is important to ensure that only constituents that cannot react with the isocyanate groups are added here.

Component B of the two-component PU adhesive according to the invention must contain at least one compound having at least two groups that react with isocyanate groups. These can be SH, COOH, NH or OH groups, for example, with polyols being preferred in particular, wherein these can also be mixtures of polyols of differing chemical structure or differing molecular weight. These compounds act as crosslinkers.

A large number of polyols are suitable as the polyol component for use in component B. For example they can be those having two up to ten OH groups per molecule. They can be aliphatic compounds or aromatic compounds, and polymers bearing an adequate number of OH groups can also be used. These can be primary or secondary OH groups, provided that they have an adequate reactivity with the isocyanate groups.

Examples of such polyols are low-molecular-weight aliphatic polyols having preferably two to ten OH groups, in particular $C_2$ to $C_{36}$ alcohols. Examples thereof are ethylene glycol, propylene glycol, butanediol-14, hexanediol-16, octanediol-18, dimer fatty acid diols, diethylene glycol, triethylene glycol, dipropylene glycol, glycerol, trimethylolpropane, pentaerythritol or sugar alcohols.

Polyols having aromatic nuclei are another group of suitable crosslinking polyols. They can be derivatives of resorcinol, pyrogallol, hydroquinone or other aromatic polyols, for example.

Another group of suitable polyols are polyethers, for example. These are the reaction products of alkylene oxides having 2 to 4 C atoms with low-molecular-weight alcohols. Examples of such compounds are polypropylene glycol, polyethylene glycol, poly-THF. The polyether polyols should have a molecular weight from 200 to 10,000 g/mol, in particular 400 to 5000 g/mol.

Polyester polyols are a further suitable group of polyol compounds for use in component B. The polyester polyols that are known for adhesives can be used. They can for example be the reaction products of diols, in particular low-molecular-weight alkylene diols or polyether diols, with dicarboxylic acids. These can be aliphatic or aromatic carboxylic acids or mixtures thereof. Esters of these carboxylic acids or anhydrides can optionally also be reacted.

Such polyester polyols are known to the person skilled in the art in many forms and are available commercially. These polyester polyols should in particular have a molecular weight from approximately 200 to approximately 20,000 g/mol, in particular from 400 to 5000 g/mol.

Polymeric lactones or polyacetals are a further group of suitable polyol compounds, provided that they have at least two functional groups and a corresponding suitable molecular weight.

OH-functional poly(meth)acrylates are a further group of suitable polyol compounds. Such poly(meth)acrylates are obtainable for example by polymerization of ethylenically unsaturated monomers, wherein a number of the monomers additionally bear an OH group. The molecular weight of such polyacrylates can for example be from 500 to 20,000, in particular less than 5000 g/mol.

Polyurethanes containing OH groups are a further group of polyols. The known polyurethanes as a reaction product of polyols and isocyanates can be used here. In this case the proportion of constituents is chosen such that polyurethanes containing OH groups are obtained. The molecular weight of such polyurethanes can be from 500 to 10,000 g/mol, in particular up to 5000 g/mol.

The suitable crosslinkers, which have at least two reactive groups, can be used individually or in a mixture. It is important to ensure that the compounds are miscible with one another and that no phase separation occurs. The viscosity can be influenced by the selection of constituents of component B. If polymeric polyols are used, B has a higher viscosity. If proportions of low-molecular-weight polyols are used, for example polyalkylene polyols having up to 12 C atoms, the viscosity will be lower. It is convenient according to the invention for component B to be liquid. This can be achieved by the selection of polyols, but in another embodiment it is possible for inert organic solvents to be added.

For an adhesive bonding result according to the invention it is necessary for component B to contain at least one low-molecular-weight compound C, which should have a nucleophilic group that reacts with NCO groups and additionally contains at least one hydrogen-bridging group. Compounds having a molecular weight below 500 g/mol, in particular below 400 g/mol, are to be understood as the low-molecular-weight compound C.

OH, NHR, SH, COOH, for example, can be included as the nucleophilic group of compound C. The OH group is particularly preferred.

Groups having carbonyl groups and/or hydroxyl groups at a C atom or at two adjacent C atoms are included as the hydrogen-bridging group. Compounds having the structures

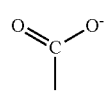
I)

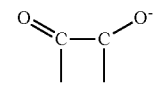
II)

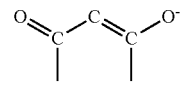
III)

or the corresponding protonated forms are suitable in particular.

It has been found that these chemical groups produce a good adhesion to metal substrates or the oxidized surfaces, in particular to aluminum substrates. A large number of compounds having corresponding functionalities are suitable here. A selection of particularly suitable compounds can be selected for example by means of a quantum-chemical calculation of the distances between the individual O groups. A distance between the O atoms of between 2.5 and 3.5 Å has been shown in particular to be suitable.

The compounds C can have various structures. For example, they can be aliphatic or cycloaliphatic compounds, and aromatic compounds having one or more phenyl nuclei can also be used. The compounds are selected such that they are compounds that are solid at room temperature. Examples of aliphatic compounds are dicarboxylic or tricarboxylic acids having 4 to 14 C atoms, which additionally also have at least one OH group at the molecule. Examples of cyclic compounds are substituted cyclohexanes, which for example have a carboxyl group and at least one OH group at the cyclohexane ring; a-hydroxyketones, 1,3-diketones or 1,3-ester ketones can be included. Examples of suitable aromatic compounds are substituted phenols, which additionally bear further substituents selected from COOH, OH, NH$_2$. A further group of compounds is those having more than one aromatic nucleus, for example substituted naphthalene carboxylic acids or substituted pyrane derivatives. Suitable compounds C have a molecular weight of below 500 g/mol, in particular below 400 g/mol.

The suitable substances must contain either a carboxyl group, a hydroxyl group in the α-position to a carbonyl group, or a hydroxyl group in the β-position to a carbonyl group or a carboxylic acid ester group. Furthermore, a reactive OH group must additionally be included, in particular a phenolic OH group.

Examples of such compounds that are particularly suitable for an adhesive according to the invention encompass morin (2-(2,4-dihydroxyphenyl)-3,5,7-trihydroxy-4H-1-benzopyran-4-one), 3,7-dihydroxy-2-naphthoic acid (3,7-dihydroxynaphthalene-2-carboxylic acid), pyrogallol carboxylic acid (2,3,4-trihydroxybenzoic acid), 3,4-dihydroxyphenyl acetic acid, gallic acid (3,4,5-trihydroxybenzoic acid), p-aminosalicylic acid (4-amino-2-hydroxybenzoic acid), pamoic acid (4,4'-methylene bis(3-hydroxy-2-naphthoic acid), citric acid (2-hydroxy-1,2,3-propanetricarboxylic acid). One of these compounds can be used, but it is also possible to use a mixture. A preferred selection uses compounds that when applied as an adhesive result in little or no discoloration of the adhesive. This is the case in particular with citric acid, gallic acid or p-aminosalicylic acid.

The two-component PU adhesive should contain compound C in an amount from 0.05 to 5 wt. %, in particular from 0.1 to 2 wt. %, relative to the complete adhesive.

It is convenient for additional constituents to be contained in these two-component PU adhesives, such as for example solvents, plasticizers, catalysts, resins, stabilizers, adhesion promoters, pigments or fillers.

In one embodiment a suitable adhesive contains at least one tackifying resin. The resin brings about an additional tackiness. All resins that are compatible, i.e. that form a largely homogeneous mixture, can be used in principle. For example, aromatic, aliphatic or cycloaliphatic hydrocarbon resins can be used, along with modified or hydrogenated versions thereof. The resins generally have a low molecular weight of below 1500 g/mol, in particular below 1000 g/mol. The resin can be used in an amount from 0 to 50 wt. %, preferably up to 30 wt. %, relative to the adhesive.

Plasticizers can moreover also be included, such as for example white oils, naphthenic mineral oils, paraffinic hydrocarbon oils, polypropylene, polybutene, polyisoprene oligomers, hydrogenated polyisoprene and/or polybutadiene oligomers, phthalates, adipates, benzoate esters, vegetable or animal oils and derivatives thereof. Plasticizers that are safe in a food regulatory sense are suitable in particular.

Sterically hindered phenols of high molecular weight, polyfunctional phenols, sulfur-containing and phosphorus-containing phenols or amines are suitable as stabilizers or antioxidants for optional use.

It is possible additionally to add silane compounds to the adhesive as adhesion promoters. The known organofunctional silanes, such as (meth)acryloxy-functional, epoxy-functional, amine-functional or non-reactively substituted silanes can be used as adhesion promoters. Examples are vinyl trialkoxysilane, alkyl trialkoxysilane, tetraalkoxysilane, 3-acryloxypropyl trialkoxysilane, 3-methacryloxypropyl trialkoxysilane, 3-aminopropyl trimethoxysilane, 3-aminopropyl triethoxysilane, 3-aminopropyl methyl dimethoxysilane, N-(2-aminoethyl)-3-aminopropyl trimethoxysilane, 3-glycidyloxymethyl trimethoxysilane, 3-glycidyloxymethyl triethoxysilane, 2-glycidyloxyethyl trimethoxysilane or corresponding dialkoxy derivatives, wherein butoxy, propoxy, in particular methoxy or ethoxy groups are preferably suitable. In a preferred embodiment 0.1 to 5 wt. % of such silanes are added to the adhesive. Depending on the choice of silane, it is convenient to mix this in one component only. A premature reaction and a reduction of the storage stability can be prevented in this way.

A two-component PU adhesive can also contain catalysts as an additive that is optionally additionally present. All known compounds that can catalyze the reaction of the OH group and NCO group can be used as catalysts. Examples are titanates, such as tetrabutyl titanate or titanium tetraacetyl acetonate; bismuth compounds, such as bismuth tris-2-ethyl hexanoate; tin carboxylates, such as dibutyl tin dilaurate (DBTL), dibutyl tin diacetate or dibutyl tin diethyl hexanoate; tin oxides such as dibutyl tin oxide and dioctyl tin oxide; organoaluminum compounds such as aluminum tris-acetyl acetonate; chelate compounds such as zirconium tetraacetyl acetonate; tort-amine compounds or salts thereof with carboxylic acids, such as triethanolamine, triethylene diamine, guanidine, morpholine, N-methyl morpholine and 1,8-diazabicyclo-(5,4,0)-undecene-7 (DBU), silane adhesion promoters with amino groups. The catalyst is used in an amount from 0.01 to approximately 5 wt. %, relative to the total weight of the adhesive, preferably from 0.05 to 1 wt. %, particularly preferably more than 0.1 wt. % of catalyst.

A particular embodiment also adds pigments to the coating agents. These are fine-particle pigments, with a particle size of <5 μm for example. One embodiment of the invention works with platelet-shaped pigments, which can be dispersed in one component of the binder. They are then in finely dispersed form, i.e. the pigments or fillers are dispersed in platelet form and thus have only a slight thickness. Such pigments are known to the person skilled in the art, for example phyllosilicates of diverse composition. Another mode of operation uses nanoparticles. These conventionally have a particle size of <500 nm, in particular less than 100 nm. Such nanopigments can for example be ones based on $TiO_2$, $SiO_2$, $Fe_2O_3$ or similar oxides or oxyhydrates. Such pigments are known to the person skilled in the art. They can be selected on the basis of conventional considerations and finely dispersed in one or both binder components by means of conventional methods.

It is possible for the adhesives also to contain solvents. These are the conventional solvents, which can evaporate at temperatures up to 120° C. The solvents can be selected from the group of aliphatic hydrocarbons, aromatic hydrocarbons, ketones, in particular $C_1$-$C_4$ alcohols, and also water. In another embodiment the two-component adhesive is solvent-free.

A suitable two-component PU adhesive consists of a component A containing reactive NCO groups, a component B containing reactive NH or in particular OH groups, and a compound C in component B. In addition, 0 to 30% of additives and auxiliary substances can be included in components A and B, in particular 1 to 15 wt. %. The additives can in principle be present in both components. It is important to ensure however that additives containing NCO-reactive groups should preferably be included in the OH component. Otherwise the storage stability of the products is reduced.

Methods for producing the corresponding components are known to the person skilled in the art: The starting materials are optionally dried and can then be mixed on known equipment. Components A and components B that are obtained are stable when stored individually. The components are mixed immediately before being applied and the crosslinking adhesive is obtained. The two components should be mixed in such a way that approximately an equal equivalents ratio of OH groups to NCO groups is included. A network is formed during crosslinking, wherein low-molecular-weight additives having OH groups can optionally also be chemically integrated into the network and then do not migrate further.

In the two-component PU adhesives the known auxiliary agents and additives can be added to component A or to component B, provided that these do not react with the additives. Solvents can be included, but a particular embodiment of the invention works without solvents. Through the selection of component A and component B it can be ensured in particular that a mixture of component A and B is obtained that has a low viscosity at room temperature, such as 25° C.

As the adhesives are suitable in particular for coating large surface areas, they should have a low viscosity at an application temperature from approximately 20 to 90° C. The viscosity of the two-component PU adhesives, measured immediately after mixing the constituents, should be between 200 and 5000 mPas at the application temperature, preferably from 500 to 3000 mPas (at 20 to 60° C., Brookfield viscometer, according to EN ISO 2555).

According to the method according to the invention a suitable adhesive is applied as a layer to a substrate. The adhesive should be applied in a film thickness from 1 g/m² to 100 g/m², preferably from 2 to 35 g/m². The application viscosity should be low. In order to simplify the coating process, it is possible to heat the two-component PU adhesive to an elevated temperature, for example from 30 to 60° C. Processing can be continued immediately after adhesive bonding with the second film layer. It has been found that the multilayer film can be processed and/or packaged due to the rapid build-up of adhesion. The adhesion between the film substrate and the metal layer is very good, and no slipping occurs.

Through the method according to the invention and the use of a suitable two-component PU adhesive it is possible to improve the adhesive bonding of multilayer films. In particular, a stable adhesive bonding of plastic substrates to other flexible substrates having a metal surface is improved. Immediately after adhesive bonding, the adhesive quickly develops a corresponding adhesive strength. This ensures that immediate further processing of the multilayer film is possible. As further processing, an adhesive bonding with additional films can be provided, a corresponding film can be printed, or packaging measures can be performed.

EXAMPLES

Example 1

Component A consists of a commercial polyester prepolymer (Liofol UK 3640, Henkel), containing a polyester comprising aliphatic and aromatic dicarboxylic acids and polyalkylene diols reacted with 4,4'-MDI in excess, with an NCO content in the prepolymer of 2.25%. The PU prepolymer has been dissolved in ethyl acetate; solids content 60%.
Viscosity: approx. 350 mPas (Brookfield, LVT) at 20° C.

The two-component laminating adhesive is obtained by mixing the above PU prepolymer with a hardener based on diethylene glycol in the ratio 1.25:1.

0.3% of one of the following substances is added to the adhesive from Example 1 in component B. The adhesives are produced in each case by mixing.

An aluminum film is laminated onto a polypropylene film (200 μm), to which an adhesive according to the invention had been applied in a film thickness of 4 g/m$^2$.

The adhesively bonded films were stored for 10 days at room temperature. Then a tensile test was performed. A further specimen was adhesively bonded in the corresponding manner and then subjected to a sterilization at 120° C., 2 bar, for 30 minutes. These specimens were likewise subjected to a tensile test (DIN 53278, 90° angle).

| Adhesion promoter | Tensile test (10 days) | Tensile test (sterilization) N/15 mm |
|---|---|---|
| Morin | 1.2 | 2.1 |
| Pyrogallol carboxylic acid | 1.6 | 3.2 |
| Dihydroxyphenyl acetic acid | 1.5 | 2.5 |
| Gallic acid | 1.4 | 2.8 |
| 4-Aminosalicylic acid | 1.7 | 2.4 |
| Citric acid | 1.3 | 1.9 |
| Aminopropyl triethoxysilane (comparison) | 1.1 | 1.2 |
| Comparison without adhesion promoter | | 0.6 |

Following sterilization the adhesively bonded films containing adhesion promoter exhibit good or improved adhesion as compared with an unstressed specimen. Furthermore, a clear improvement can be established in comparison to a known adhesion promoter and a specimen without additive.

What is claimed is:

1. A method for adhesively bonding substrates, comprising:
   providing a two-component polyurethane adhesive;
   providing a film;
   applying the two-component polyurethane adhesive to the film and then applying a second film to the adhesive, the two-component polyurethane adhesive being used consists of
   a component A containing at least one prepolymer having at least two NCO groups,
   a component B containing at least one polymeric or oligomeric crosslinker having at least two groups that react with NCO groups, wherein component B contains 0.05 to 5 wt. % of a low-molecular-weight compound C,
   wherein compound C has a nucleophilic group that reacts with NCO groups and contains a hydrogen-bridging group, selected from O=C—O$^-$ or O=C—C—O$^-$ or O=C—C=C—O$^-$ or protonated forms.

2. The method according to claim 1, wherein compound C additionally contains a nucleophilic group selected from —OH, —NHR, —SH, —COOH.

3. The method according to claim 1, wherein component A contains at least one PU prepolymer based on a reaction product of a polyether diol or polyester diol reacted with a stoichiometric excess of aromatic diisocyanates.

4. The method according to claim 1, wherein component B contains a crosslinker having OH or NH groups with a molecular weight; of less than 3000 g/mol.

5. The method according to claim 1, wherein compound C forms a complex with aluminum surfaces.

6. The method according to claim 1, wherein compound C has an aromatic backbone.

7. The method according to claim 1, wherein compound C is included in an amount from 0.1 to 2 wt. %.

8. The method according to claim 1, wherein a first film has a metallic surface, the adhesive is applied to said metallic surface, then the film coated in this way is adhesively bonded to a further substrate.

9. The method according to claim 1, wherein the adhesive is applied in an amount from 1 to 100 g/m$^2$.

10. The method according to claim 1, wherein the adhesive has a viscosity of 200 to 5000 mPas (20 to 60° C., EN ISO 2555).

11. The method according to claim 10, wherein the adhesive is applied at a temperature of 25 to 75° C.

12. The method according to claim 1, wherein the nucleophilic groups from C react more slowly with the NCO groups than the reactive groups of component B.

13. A multilayer film produced by a method according to claim 1, wherein at least one film includes a metallized surface.

14. The multilayer film according to claim 13, wherein the metallized surface consists of aluminum.

15. The multilayer film according to claim 13, wherein the adhesive layer has a film concentration of less than 100 g/m$^2$.

* * * * *